United States Patent
Morita et al.

(10) Patent No.: US 8,467,715 B2
(45) Date of Patent: *Jun. 18, 2013

(54) SYSTEM AND METHOD FOR JUST-IN-TIME TRAINING IN SOFTWARE APPLICATIONS

(75) Inventors: Mark M. Morita, Arlington Heights, IL (US); Prakash Mahesh, Schaumburg, IL (US)

(73) Assignee: General Electric Company, Schenectady, NY (US)

( * ) Notice: Subject to any disclaimer, the term of this patent is extended or adjusted under 35 U.S.C. 154(b) by 561 days.

This patent is subject to a terminal disclaimer.

(21) Appl. No.: 11/324,555

(22) Filed: Jan. 3, 2006

(65) Prior Publication Data

US 2007/0166672 A1 Jul. 19, 2007

(51) Int. Cl.
*G09B 3/00* (2006.01)
*G06F 3/00* (2006.01)

(52) U.S. Cl.
USPC ........... 434/350; 434/322; 715/705; 715/707; 715/709

(58) Field of Classification Search
USPC .. 434/118, 323, 635, 350, 322, 335; 715/705, 715/707, 709
See application file for complete search history.

(56) References Cited

U.S. PATENT DOCUMENTS

| | | | | |
|---|---|---|---|---|
| 5,560,011 | A | * | 9/1996 | Uyama .......................... 718/107 |
| 5,602,982 | A | * | 2/1997 | Judd et al. ..................... 715/709 |
| 5,724,262 | A | * | 3/1998 | Ghahramani ................. 702/186 |
| 6,301,462 | B1 | * | 10/2001 | Freeman et al. .............. 434/350 |
| 6,498,920 | B1 | * | 12/2002 | Simon ........................... 434/350 |
| 6,587,668 | B1 | * | 7/2003 | Miller et al. .................. 434/350 |
| 6,589,055 | B2 | * | 7/2003 | Osborne et al. ............... 434/219 |
| 6,882,825 | B2 | * | 4/2005 | Hopkins et al. ............... 434/350 |
| 6,944,624 | B2 | * | 9/2005 | Orton et al. ................... 707/102 |
| 7,240,353 | B2 | * | 7/2007 | Lau et al. ......................... 725/24 |
| 7,302,419 | B2 | * | 11/2007 | Conkwright et al. ............... 1/1 |
| 2001/0046660 | A1 | * | 11/2001 | Krueger ........................ 434/219 |
| 2002/0133490 | A1 | * | 9/2002 | Conkwright et al. ............. 707/9 |
| 2005/0147946 | A1 | * | 7/2005 | Ramamurthy et al. ....... 434/118 |
| 2005/0181349 | A1 | * | 8/2005 | Bardige et al. ................ 434/362 |

* cited by examiner

*Primary Examiner* — Kang Hu (74) *Attorney, Agent, or Firm* — Hanley, Flight and Zimmerman, LLC (57) ABSTRACT

Certain embodiments of the present invention provide a method for just-in-time training in software applications including tracking usage of an application by a user, determining a task the user is attempting to perform based at least in part on the tracked usage, and offering training content to the user based at least in part on the task. The training content is offered substantially when the user is attempting to perform the task.

20 Claims, 5 Drawing Sheets

SYSTEM AND METHOD FOR JUST-IN-TIME TRAINING IN SOFTWARE APPLICATIONS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to training in software applications. In particular, the present invention relates to systems and methods for just-in-time training in software applications.

Many applications include online help or training. However, users typically never utilize such assistance for a variety of reasons. For example, online help in current systems is often difficult to utilize fully. Users often must try several different search terms to locate the desired information. Also, users frequently must "drill down" through many parts and subparts to locate help for a particular feature of interest. In addition, once found, such help does not provide training to accomplish a task, but rather only describes generally what a button or command does, not how to use a feature or capability to accomplish a task. A task may be an interaction process that requires multiple steps and/or phases which may involve accessing interfaces that may not be visible or otherwise intuitive. For example, a task may require a particular sequence of inputs that are not expressly laid out for a user or readily discerned. Even interface components, such as dialogs, that have their own help buttons do not allow a user to access help and/or training for the specific task they are trying to perform, but instead only provide a general overview of various options present in a particular dialog.

Often, training may be provided to users of a new software application or upgrade when it is first made available to the users. This training may take the form of a video or live presentation. Frequently, users may receive an in-depth overview of the new software application or upgrade. Sometimes an application specialist will be provided to assist users during the initial deployment of the new software application or upgrade. Users may then ask questions to the application specialist about the user's specific situation. However, after this initial training, users tend to forget details for less frequently utilized features and capabilities.

When a user is first exposed to a complex system, the user tends to rely upon basic functionalities to accomplish tasks. Users tend not to utilize capabilities of a system if they cannot easily figure out how to use those features. However, a user that is more experienced with the system may use more advanced functionalities in order to complete the same tasks in a more timely manner. Because many systems are quite complex, the amount of time necessary to bring a less experienced user up to speed with the more senior users may be extensive. Time consuming training cuts the productivity of senior users, making training expensive, but the less experienced users must catch up somehow.

One example of a complex system is a Picture Arching and Communicating System (PACS) workstation used in a clinical care setting. The PACS workstation is used by a community of users that perform similar tasks. Unfortunately, the PACS workstation is somewhat intolerant of mistakes, which inhibits new and/or less experienced users from experimenting with different functionalities. Thus, less experienced PACS workstation users often develop a habit of using only basic functionalities to complete tasks.

An example of one application used on a PACS workstation is a software application for the manipulation and examination of three-dimensional volumetric datasets. For example, a series of axial CT image slices may be combined to create a three-dimensional volumetric dataset. The application may then allow the user to reformat and/or generate new image slices from the dataset. The application may include a feature that allows, for example, bones to be segmented so that the user can generate and view the images with only soft tissues shown.

Although many tasks may be completed using basic functionalities, the same tasks may often be completed in a more timely manner by utilizing advanced and/or streamlined functionalities. Failure to realize when advanced and/or streamlined functionalities are available may cause less experienced users to spend more time on tasks than experienced users, creating a disparity in efficiency between the two types of users. Thus, continuing the example from above, less experienced users of PACS workstations may not use certain features and/or applications because of their lack of knowledge, reducing efficiency.

Sometimes a less experienced user of a software application may actually have great experience with a small subset of the capabilities of a program, but almost no experience with other, seldom-used features. This results in users not utilizing capabilities because of inexperience. Thus, rather than spend time to learn the features they have little experience with, users may instead simply not perform certain tasks, or may perform them using known methods that are much less efficient. Some users, such as physicians, use software applications for life critical decisions. When a user is unable to learn how to take advantage of features they are less experienced with, the capabilities of the application to aid in diagnosing and treating patients are wasted.

In order for the less experienced users to catch up with the experienced users, one-on-one training and/or time consuming experimentation is often required, which are inefficient. One way to decrease the disparity in efficiency between experienced users and less experienced users is to incorporate customized training into the system itself that is available to users when they require it. Thus, a need exists for a system and method for just-in-time training in software applications.

BRIEF SUMMARY OF THE INVENTION

Certain embodiments of the present invention provide a method for just-in-time training in software applications including tracking usage of an application by a user, determining a task the user is attempting to perform based at least in part on the tracked usage, and offering training content to the user based at least in part on the task. The training content is offered substantially when the user is attempting to perform the task.

In an embodiment, the tracked usage includes time spent. In an embodiment, the training content is offered based at least in part on a user preference. In an embodiment, the determining step further includes determining a task based at least in part on context. In an embodiment, the training content is offered automatically. In an embodiment, the offering step further includes indicating that the training content is available. In an embodiment, the offering step further includes presenting the training content based at least in part on a request from the user. In an embodiment, the offering step further includes presenting the training content to the user. In an embodiment, the training content is for the task. In an embodiment, the training content includes at least one of text, images, video, and audio. In an embodiment, the training content is interactive. In an embodiment, the training content is scaffolded training content. In an embodiment, the training content is based at least in part on actual data of the user.

Certain embodiments of the present invention provide a system for just-in-time training in software applications including a tracking component and a training component. The tracking component is capable of tracking usage of an application by a user. The training component is capable of determining a task the user is attempting to perform based at least in part on the tracked usage. The training component is capable of offering training content to the user based at least in part on the determined task when the user is attempting to perform the task.

In an embodiment, the tracking component is a separate application from the application. In an embodiment, the training component is capable of automatically offering the training content. In an embodiment, the training component is capable of indicating that the training content is available. In an embodiment, the training component is capable of presenting the training content based at least in part on a request from the user. In an embodiment, the training component is capable of presenting the training content to the user.

Certain embodiments of the present invention provide a computer-readable medium including a set of instructions for execution on a computer, the set of instructions including a tracking routine and a training routine. The tracking routine is configured to track usage of at least one application by a user. The training routine is configured to offer just-in-time training content to the user based at least in part on the determined task.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 1:
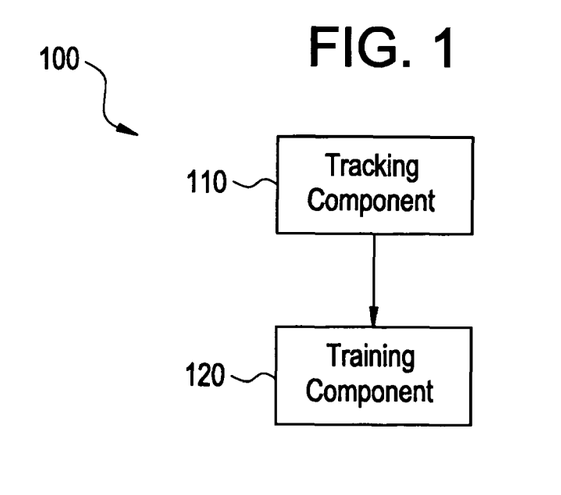
FIG. 1 illustrates a system for just-in-time training in software applications used in accordance with an embodiment of the present invention.

FIG. 1 illustrates a system 100 for just-in-time training in software applications used in accordance with an embodiment of the present invention. System 100 includes a tracking component 110 and a training component 120. The training component 120 is in communication with the tracking component 110.

In operation, the tracking component 110 is capable of tracking the usage of at least one application by a user. That is, the tracking component 110 is capable of monitoring and/or recording some or all of the use of one or more applications by a user. For example, tracking component 110 may monitor the amount of time a user spends between activating or selecting various components, features, and/or capabilities of a software application. As another example, tracking component 110 may monitor menu items, buttons, and/or other controls selected and/or manipulated by a user in several related applications that are capable of interacting with each other. As another example, tracking component 110 may store information about functionality utilized by a user. Tracking may also capture specific sequences of mouse clicks or steps used to complete a certain task. For example, the distance a mouse cursor is moved may be included in tracked usage. As another example, the time between mouse clicks may be monitored.

The tracking component 110 may be configurable. For example, the tracking component 110 may be configured to track usage of functionality by users that are members of a certain user group. The tracking component 110 may also be configured to track usage of functionality by all users of the system. The tracking component 110 may be configured such that new user groups may be added and existing user groups may be deleted. The tracking component 110 may also be configured such that users may be tracked as members of multiple user groups or members of no user group at all. The tracking component 110 may be configured to track a user based on user preferences. Other desirable ways to configure the tracking component 110 may exist.

In an embodiment, the tracking component 110 may be implemented as a separate application. That is, the tracking component 110 may not increase the footprint of an existing application, but rather runs in a separate process space and/or context of execution and is capable of monitoring and/or tracking a user's interaction with one or more applications.

The training component 120 may receive tracked usage. The tracked usage may be the usage tracked by the tracking component 110, for example. In an embodiment, the tracked usage is provided to training component 120 based at least in part on a request from training component 120. In an embodiment, the tracked usage is provided to training component 120 automatically.

The training component 120 is capable of offering training content to a user based at least in part on tracked usage. Training component 120 may be capable of offering training content automatically. For example, the training component 120 may offer training content when the tracked usage indicates that a user is using an application, feature, capability, and/or tool set sub-optimally or not effectively. Alternatively, the training component 120 may be capable of offering training content to a user based at least in part on input and/or a request from the user, for example.

Training content may include, for example, text, images, video, and/or audio. For example, training content may include a series of screen captures that have been annotated to illustrate how to perform a task. As another example, training content may include a video clip of how a task may be accomplished narrated by an expert at the particular task. As another example, training content may include animated screen captures showing the exact movement of the cursor. Training content may also include audio and/or video of an expert describing best practices in performing a particular task and/or clinical benefits.

Offering training content may include, for example, indicating to a user that training content is available for a particular task. The training component 120 may provide an indicator to the user through the software application's user interface, for example. For example, when a user is attempting to perform a task, the training component 120 may provide a list of training content to the user including available training content related to the task the user is attempting to perform and/or related tasks. As another example, an indicator, such as an icon or symbol, may be presented to a user that indicates training content related to the task the user is attempting to perform is available.

Training component 120 may be capable of determining a task the user is attempting to perform, for example. The training component 120 may determine the task based at least in part on the tracked usage, for example. For example, based at least in part on menus, buttons, and/or controls a user is manipulating in an application, training component 120 may determine that a user is attempting, perhaps unsuccessfully, to accomplish a particular task. As another example, training component 120 may determine a task the user is attempting to perform based at least in part on the use of an "undo" command and/or repeating similar actions. As another example, training component 120 may determine a task based at least in part on the amount of time a user spends in a particular mode and/or component of an application. If the user spends, for example, three times as long as a normal user in a segmenting utility, the training component 120 may determine that the user is attempting to perform a segmenting task and that training content may need to be offered because the user is having difficulties.

Offering training content may include, for example, presenting training content to a user. For example, based at least in part on the usage tracked by the tracking component 110, training component 120 may automatically begin presenting and/or displaying training content to a user.

The training component 120 may offer training content to a user just-in-time. That is, the training content may be offered to the user when or substantially when the user has a need for the training to accomplish the particular task they are attempting to perform. For example, training content may be offered to the user in real time or substantially real time based on user activity. As another example, training content may be offered to the user when the user is attempting to perform a task. Just-in-time training may include, for example, providing training content when the system 100 determines the user may benefit from the training. As another example, just-in-time training may include training provided at the request of the user, perhaps when the user recognizes a need for training for a particular task. Training content may be offered when updated and/or new features, functionality, and/or capabilities become available in an application. Training content may be offered when a user has never attempted and/or performed, or only infrequently has attempted and/or performed a task in a particular context. For example, a user may frequently read chest x-ray images and thus may not require just-in-time training. However, when the user attempts to read an abdominal x-ray image, just-in-time training may be provided when the user has never read such an image before or does so infrequently, for example.

The training component 120 may offer the training content using an interface similar to the interface illustrated in FIG. 2, for example, which will now be described in more detail.

Figure 2:
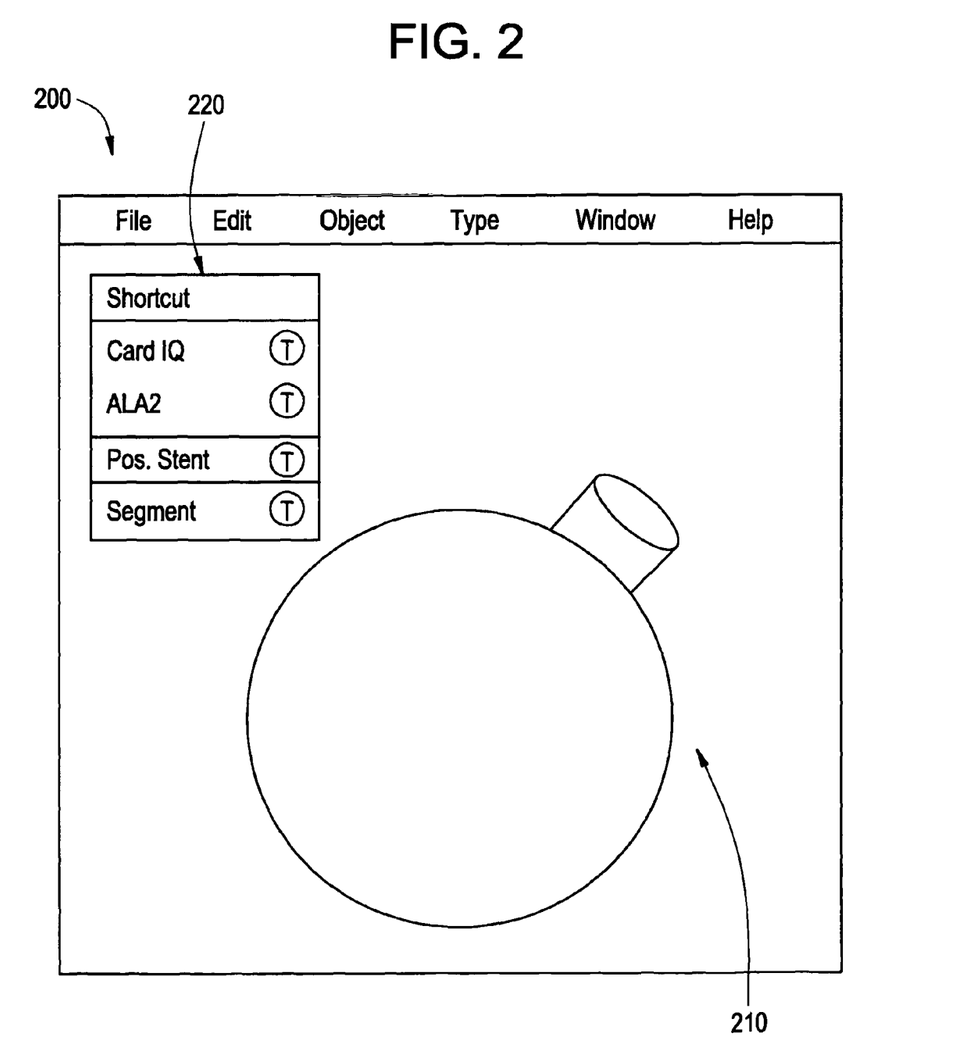
FIG. 2 illustrates an interface for just-in-time training in software applications used in accordance with an embodiment of the present invention.

FIG. 2 illustrates an interface 200 for just-in-time training in software applications used in accordance with an embodiment of the present invention. The interface 200 includes an application interface 210 and a contextual task list 220. It should be emphasized that FIG. 2 illustrates a contextual task list 220, but that it would be known to one having ordinary skill in the art that other implementations are possible.

The application interface 210 is the standard interface to the software application or applications being used by the user. The contextual task list 220 may include a list of tasks the user may be attempting to perform. The contextual task list 220 allows a user to select a task to receive just-in-time training for the task. The contextual task list 220 may be automatically offered and/or presented to the user. The contextual task list 220 may be automatically offered and/or presented to the user by a training component. The training component may be similar to training component 120, described above, for example.

The contextual task list 220 may contain entries based at least in part on usage data and/or the current context that a user is operating an application in. That is, the context for one or more of the tasks included in the contextual task list 220 may be determined based at least in part on data tracked and/or monitored regarding a user's usage of a software application. The usage data may be tracked and/or monitored by a tracking component. The tracking component may be similar to tracking component 110, described above, for example.

In an embodiment, a user may select an entry from the contextual task list 220 to receive just-in-time training for the selected task. In an embodiment, just-in-time training for a task may be presented to a user automatically. The just-in-time training may include training content, for example. The training content presented to the user may be determined based at least in part on tracked and/or monitored usage data. The training content presented to the user may be based on a probable and/or likely task or tasks the user is attempting to perform. The task or tasks the user is attempting to perform may be determined based at least in part on the tracked and/or monitored usage data.

Returning now to the discussion of system 100 as illustrated in FIG. 1, the training component 120 may offer training content to a user. The training content may be offered and/or presented by an interface for training content similar to the interface for training content illustrated in FIG. 3, for example, which will now be discussed in more detail.

Figure 3:
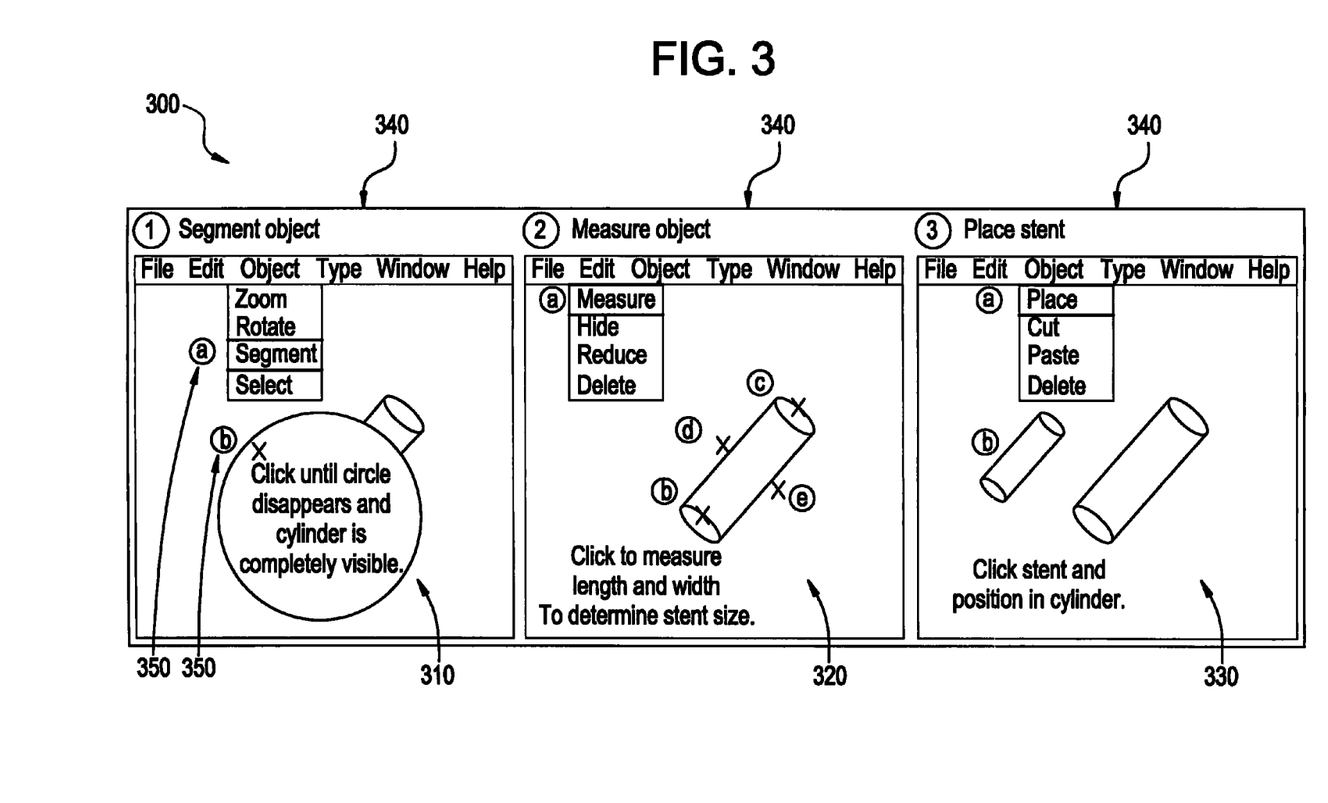
FIG. 3 illustrates an interface for training content used in accordance with an embodiment of the present invention.

FIG. 3 illustrates an interface 300 for training content used in accordance with an embodiment of the present invention. Interface 300 includes a series of images 310, 320, 330, step headings 340, and task step indicators 350.

Interface 300 is capable of presenting training content to a user. The training content may be presented as one or more of images, text, video, and/or audio, for example. As illustrated in FIG. 3, interface 300 presents training content as steps or phases in a particular task. One or more major phases and/or steps of the task may be illustrated by a separate image, such as image 310, image 320, and/or image 330.

One or more of images 310, 320, and/or 330 may have a step heading 340, for example. A step heading 340 may convey to the user what is occurring and/or what goal is to be achieved by the phase and/or step in the task.

One or more task steps and/or phases may include one or more task step indicators 350. The task step indicators 350, as illustrated in FIG. 3, convey the action or actions to be taken and the order of those actions to perform the step and/or phase. Alternatively, the order of the steps and/or phrases may be illustrated by animations along with or in place of task step indicators 350.

Although interface 300 is discussed above utilizing images, one having ordinary skill in the art would appreciate that other implementations are possible. For example, interface 300 may include one or more of and/or combinations of one or more of text, images, audio, and/or video to present, display, and/or convey training content to a user.

Returning now to the discussion of system 100 as illustrated in FIG. 1, the training component 120 may be configurable. For example, the training component 120 may be configured to suggest training content to users for functionality and/or capabilities not being used when a configurable percentage of users of the system and/or of, for example, experienced or expert users, use the functionality and/or capability. For example, the training component 120 may be configured to suggest training content to users not using a functionality when fifty percent of expert users use the functionality in a similar situation. In an embodiment, training content may be offered based at least in part on user preference. That is, a user may configure, at least in part, circumstances, context, tasks, and/or other conditions under which training content may or may not be offered. For example, a user may know of a different, and perhaps more efficient, way to accomplish a task, but may choose a different technique in order to examine intermediate steps that may not have been available with the different technique. Other desirable ways to configure the training component 120 may exist.

In an embodiment, some or all of the training content may be interactive. For example, while training content is being presented to the user, the user may control the pace and/or speed of the presentation. As another example, the user may be able to interact with the training content by following instructions provided by the training content to walk a user through a task. The user may participate in a simulation of one or more steps and/or phases of the task, for example.

In an embodiment, training content includes and/or is based at least in part on generic data. That is, training content for a particular task includes a generic example of training to perform the task.

In an embodiment, training content includes and/or is based at least in part on data the user is operating on. For example, a user may be manipulating three-dimensional volumetric data to generate image slices to be evaluated. A user may desire to segment bones from the dataset so that only soft tissues are shown. Training content may be provided to aid the user in this task that utilizes, at least in part, the actual data being manipulated by the user rather than a pre-specified example and/or scenario. For example, training content may include one or more medical images a user is attempting to manipulate with a PACS application. In an embodiment, the training content automates the manipulation of the user's actual or "live" data, at least in part, to provide the training. For example, the training content may demonstrate some steps automatically, without requiring input from the user to perform one or more steps in the task. In an embodiment, the training content instructs the user on the steps necessary, and how to perform them, to accomplish a particular task while the user operates on the actual or "live" data.

In an embodiment, training content may include scaffolded training content. Scaffolded training content refers to a training technique whereby a user is trained to, for example, perform a task or utilize a functionality and/or capability in stages. For example, a user is first trained to perform a first step. The user is then trained to perform subsequent, perhaps more involved steps, that build on previously trained steps. As another example, scaffolded training content may be viewed as training wheels on a bicycle. The scaffolded training content trains the user in the proper forms and techniques and then the scaffold may be taken away allowing the user to perform tasks on their own. For example, scaffolding may include training content that provides guidance to help a user better remember the sequence of steps to complete a particular task.

The components and/or functionality of system 100 and/or interface 200 and/or interface 300 may be implemented alone or in combination in hardware, firmware, and/or as a set of instructions in software, for example. Certain embodiments may be provided as a set of instructions residing on a computer-readable medium, such as a memory, CD, DVD, or hard disk, for execution on a general purpose computer or other processing device, such as, for example, a PACS workstation.

Figure 4:
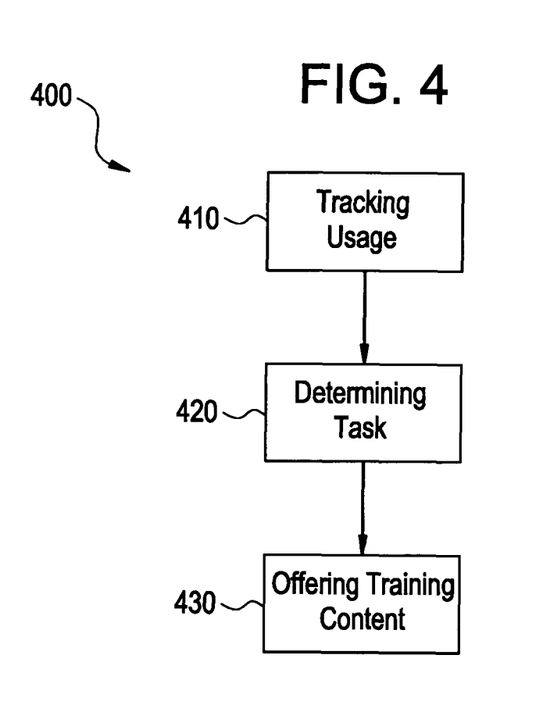
FIG. 4 illustrates a flow diagram for a method for just-in-time training in software applications used in accordance with an embodiment of the present invention.

FIG. 4 illustrates a flow diagram for a method 400 for just-in-time training in software applications used in accordance with an embodiment of the present invention. The method 400 includes the following steps, which will be described below in more detail. At step 410, usage is tracked. At step 420, a task is determined. At step 430, training content is offered. The method 400 is described with reference to elements of systems described above, but it should be understood that other implementations are possible.

At step 410, usage is tracked. Usage may be tracked for one or more applications. Usage may be tracked by a tracking component. The tracking component may be similar to tracking component 110, described above, for example.

The tracking of usage may include monitoring and/or recording some or all of the use of one or more applications by a user. For example, tracking component 110 may monitor the amount of time a user spends between activating or selecting various components, features, and/or capabilities of a software application. As another example, tracking component 110 may monitor menu items, buttons, and/or other controls selected and/or manipulated by a user in several related applications that are capable of interacting with each other. As another example, tracking component 110 may store information about functionality utilized by a user.

The tracking of usage may be configurable. For example, usage may be tracked based on user preferences and/or user identity. The tracking of usage configurable similar to the configuration of the tracking component 110, described above, for example.

In an embodiment, the tracking may occur in a separate application. That is, the tracking of usage may not increase the footprint of an existing application, but rather may occur in a separate process space and/or context of execution and monitor and/or track a user's interaction with one or more applications.

At step 420, a task is determined. The task may be the task a user is attempting to perform. The task may be determined based at least in part on tracked usage. The tracked usage may be similar to the usage tracked at step 410, described above, for example.

The task may be determined at least in part by a training component. The training component may be similar to training component 120, described above, for example. The task may be determined in a manner similar to that used by training component 120, described above, for example. Training component 120 may be capable of determining a task the user is attempting to perform, for example. For example, based at least in part on menus, buttons, and/or controls a user is manipulating in an application, the task that a user is attempting to perform may be determined. As another example, a task the user is attempting to perform may be determined based at least in part on the use of an "undo" command and/or repeating similar actions. As another example, the particular task a user is attempting to perform may be determined based at least in part on the amount of time a user spends in a particular mode and/or component of an application. If the user spends, for example, three times as long as a normal user in a segmenting utility, it may be determined that the user is attempting to perform a segmenting task and that training content may need to be offered because the user is having difficulties.

At step 430, training content is offered. Training content may be offered automatically. For example, the training content may be offered when it is determined that a user is using an application, feature, capability, and/or tool set sub-optimally or not effectively. Alternatively, training content may be offered based at least in part on input and/or a request from a user, for example. Training content may be offered based at least in part on tracked usage. The tracked usage may be the usage tracked at step 410, described above, for example. The training content may be offered based at least in part on a task. The task may be the task determined at step 420, described above, for example. The training content may be offered by a training component. The training component may be similar to training component 120, described above, for example.

Offering training content may include, for example, indicating to a user that training content is available for a particular task. An indicator to the user may be provided through the software application's user interface, for example. For example, when a user is attempting to perform a task, the training component 120 may provide a list of training content to the user including available training content related to the task the user is attempting to perform and/or related tasks. As another example, an indicator, such as an icon or symbol, may be presented to a user that indicates training content related to the task the user is attempting to perform is available. Offering training content may include, for example, presenting training content to a user. For example, based at least in part on the usage tracked by the tracking component 110, training component 120 may automatically begin presenting and/or displaying training content to a user.

The training content may be offered to a user just-in-time. That is, the training content may be offered to the user when the user has a need for the training to accomplish the particular task they are attempting to perform. The training content may be offered using an interface similar to the interface illustrated in FIG. 2, for example, as discussed above.

One or more of the steps of the method 400 may be implemented alone or in combination in hardware, firmware, and/or as a set of instructions in software, for example. Certain embodiments may be provided as a set of instructions residing on a computer-readable medium, such as a memory, CD, DVD, or hard disk, for execution on a general purpose computer or other processing device, such as, for example, a PACS workstation.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Figure 5:
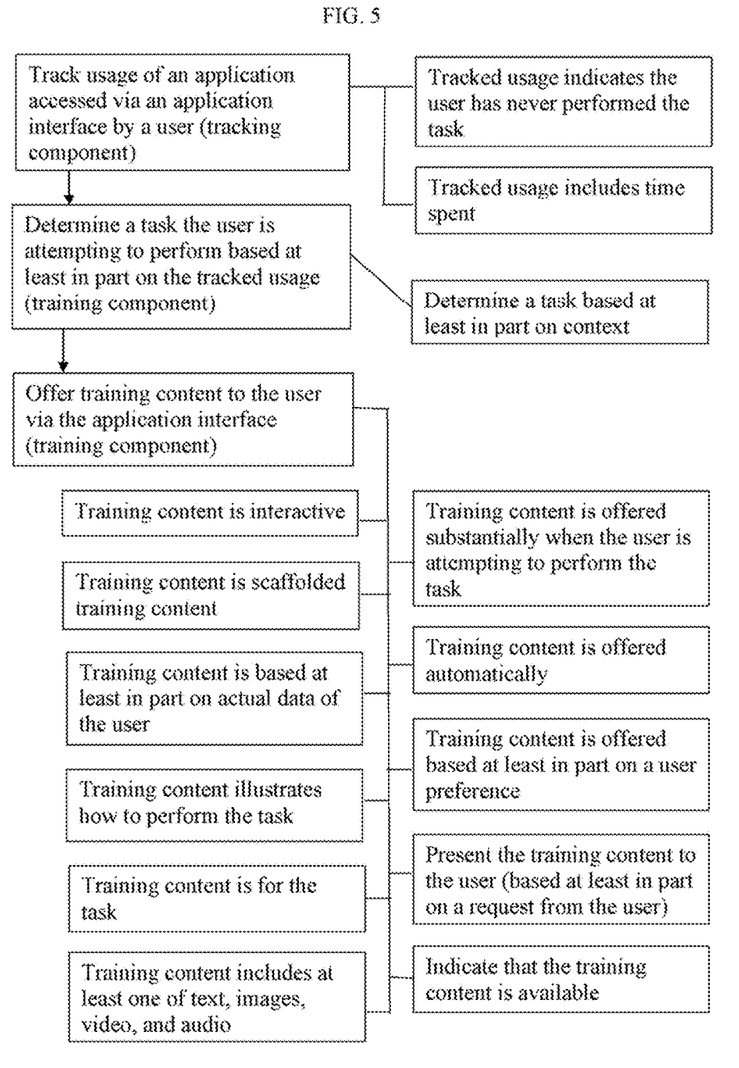
FIG. 5 illustrates a flow diagram for just-in-time training in software applications used in accordance with an embodiment of the present invention.

FIG. 5 illustrates a flow diagram for just-in-time training in software applications used in accordance with an embodiment of the present invention.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for just-in-time training in software applications, the method including:
    using a computer processor operably associated with a user interface to track usage of an application accessed via the user interface by a user that is a member of a certain user group;
    using the computer processor to determine a task the user is attempting to perform based at least in part on the tracked usage;
    using the computer processor to determine whether at least a predetermined percentage of the user group use a functionality to perform the task; and
    using the computer processor to offer training content to the user via the user interface if the tracked usage indicates the user has never performed the task using the functionality and at least the predetermined percentage of the user group use the functionality to perform the task,
    wherein the training content is offered as the user is attempting to perform the task.

2. The method of claim 1, wherein the tracked usage includes time spent.

3. The method of claim 1, wherein the training content is offered based at least in part on a user preference.

4. The method of claim 1, wherein the determining step further includes determining a task based at least in part on context.

5. The method of claim 1, wherein the training content is offered automatically.

6. The method of claim 1, wherein the offering step further includes indicating that the training content is available.

7. The method of claim 6, wherein the offering step further includes presenting the training content based at least in part on a request from the user.

8. The method of claim 1, wherein the offering step further includes presenting the training content to the user.

9. The method of claim 1, wherein the training content illustrates how to perform the task using the functionality.

10. The method of claim 1, wherein the training content includes at least one of text, images, video, and audio.

11. The method of claim 1, wherein the training content is interactive.

12. The method of claim 1, wherein the training content is scaffolded training content.

13. The method of claim 1, wherein the training content is based at least in part on actual data of the user.

14. A system for just-in-time training in software applications, the system including:
    a computer processor operably associated with a user interface, a tracking component and a training component,
    wherein the tracking component is configured to use the processor to track usage of a software application accessed via the user interface by a user that is a member of a certain user group,
    wherein the training component is configured to use the processor to determine a task the user is attempting to perform based at least in part on the tracked usage,
    wherein the training component is configured to use the processor to determine whether at least a predetermined percentage of the user group use a functionality to perform the task,
    wherein the training component is configured to use the processor to offer training content to the user via the user interface if the tracked usage indicates the user has never performed the task using the functionality and at least the predetermined percentage of the user group use the functionality to perform the task, and wherein the training content is offered as the user is attempting to perform the task.

15. The system of claim 14, wherein the tracking component is a separate application from application being accessed by the user.

16. The system of claim 14, wherein the training component is configured to use the processor to automatically offer the training content.

17. The system of claim 14, wherein the training component is configured to use the processor to indicate that the training content is available.

18. The system of claim 17, wherein the training component is configured to use the processor to present the training content based at least in part on a request from the user.

19. The system of claim 14, wherein the training component is configured to use the processor to present the training content to the user.

20. A non-transitory computer-readable medium including a set of instructions for execution on a computer, the set of instructions including:

a tracking routine configured to track usage of at least one application by a user that is a member of a certain user group; and a training routine configured to determine a task the user is attempting to perform based at least in part on the tracked usage, the training routine configured to determine whether at least a predetermined percentage of the user group use a functionality to perform the task, and the training routine configured to offer training content to the user if the tracked usage indicates the user has never performed the task using the functionality and at least the predetermined percentage of the user group use the functionality to perform the task, wherein the training content is offered as the user is attempting to perform the task.

* * * * *